(No Model.)   3 Sheets—Sheet 1.

C. G. ROLLINS.
MIDDLINGS PURIFIER.

No. 308,099.   Patented Nov. 18, 1884.

WITNESSES:   INVENTOR.
Fred. G. Dieterich.   Charles G. Rollins
E. P. Hough.   By Chas. J. Gooch
   ATTORNEY (No Model.) 3 Sheets—Sheet 2.

C. G. ROLLINS.
MIDDLINGS PURIFIER.

No. 308,099. Patented Nov. 18, 1884.

WITNESSES:
Fred. G. Dieterich
E. P. Hough

INVENTOR.
Chas. G. Rollins
By Chas. J. Gooch
ATTORNEY (No Model.) 3 Sheets—Sheet 3.

C. G. ROLLINS.
MIDDLINGS PURIFIER.

No. 308,099. Patented Nov. 18, 1884.

Witnesses:
E. P. Hough
C. E. Jones.

Inventor:
Charles G. Rollins
By Chas. J. Gooch
Attorney

UNITED STATES PATENT OFFICE.

CHARLES G. ROLLINS, OF MINNEAPOLIS, MINNESOTA.

MIDDLINGS-PURIFIER.

SPECIFICATION forming part of Letters Patent No. 308,099, dated November 18, 1884.

Application filed July 7, 1883. (No model.)

*To all whom it may concern:*

Be it known that I, CHARLES G. ROLLINS, a citizen of the United States of America, residing at Minneapolis, in the county of Hennepin and State of Minnesota, have invented certain new and useful Improvements in Middlings-Purifiers, of which the following is a specification, reference being had therein to the accompanying drawings.

This invention relates to machines for purifying flour and middlings.

Figure 1:
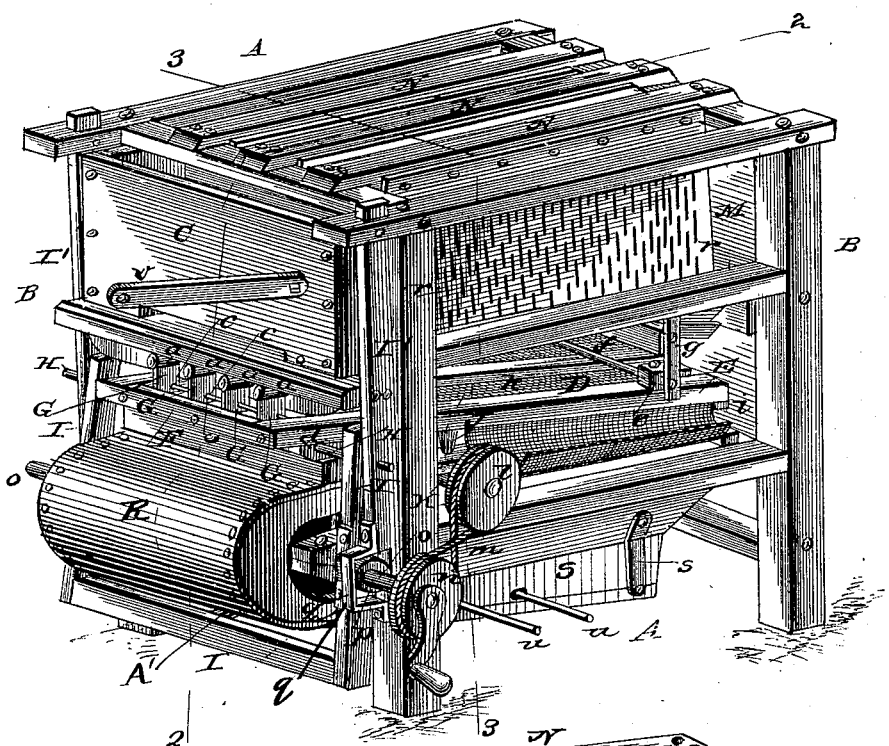
Figure 4:
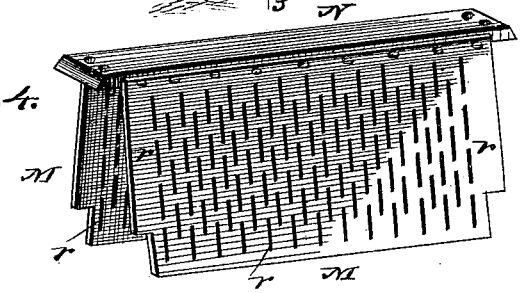
Figure 5:
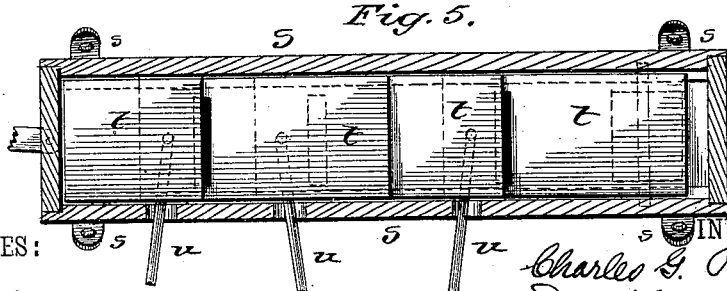
Figure 2:
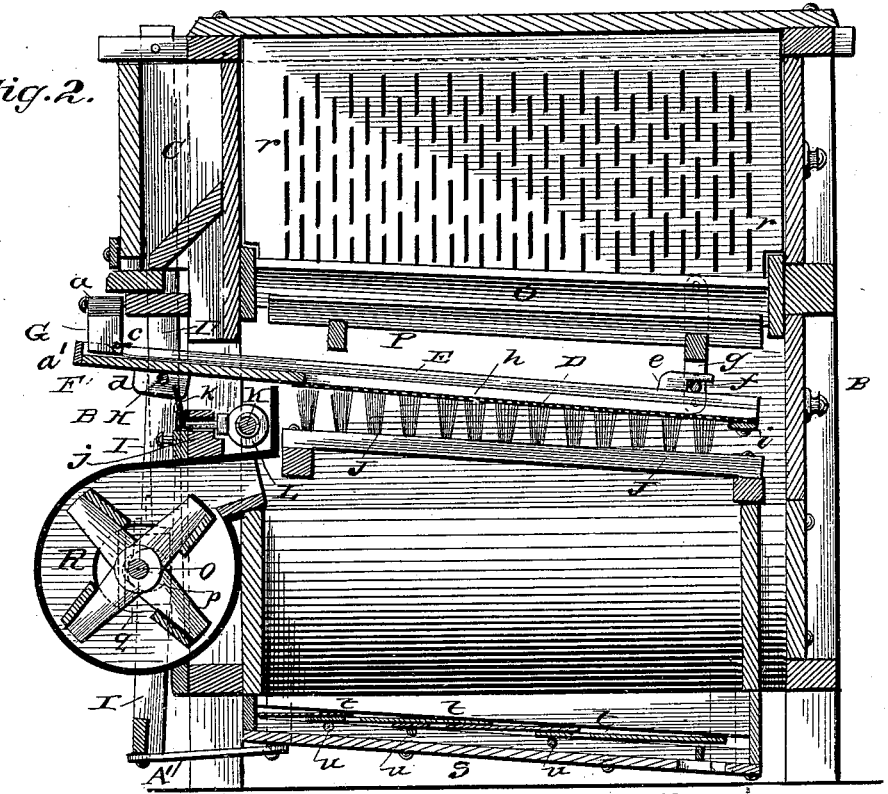
Figure 3:
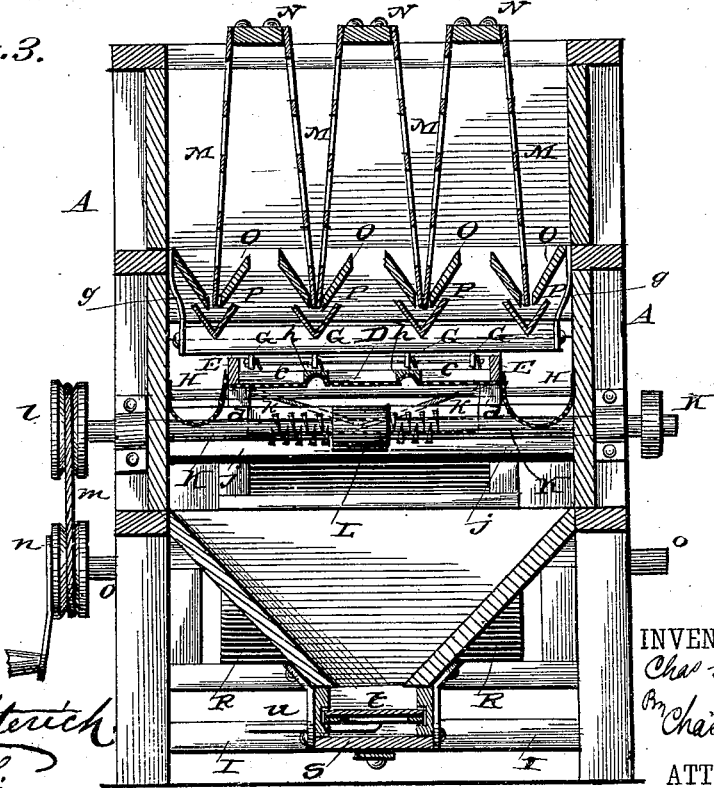
Figure 6:
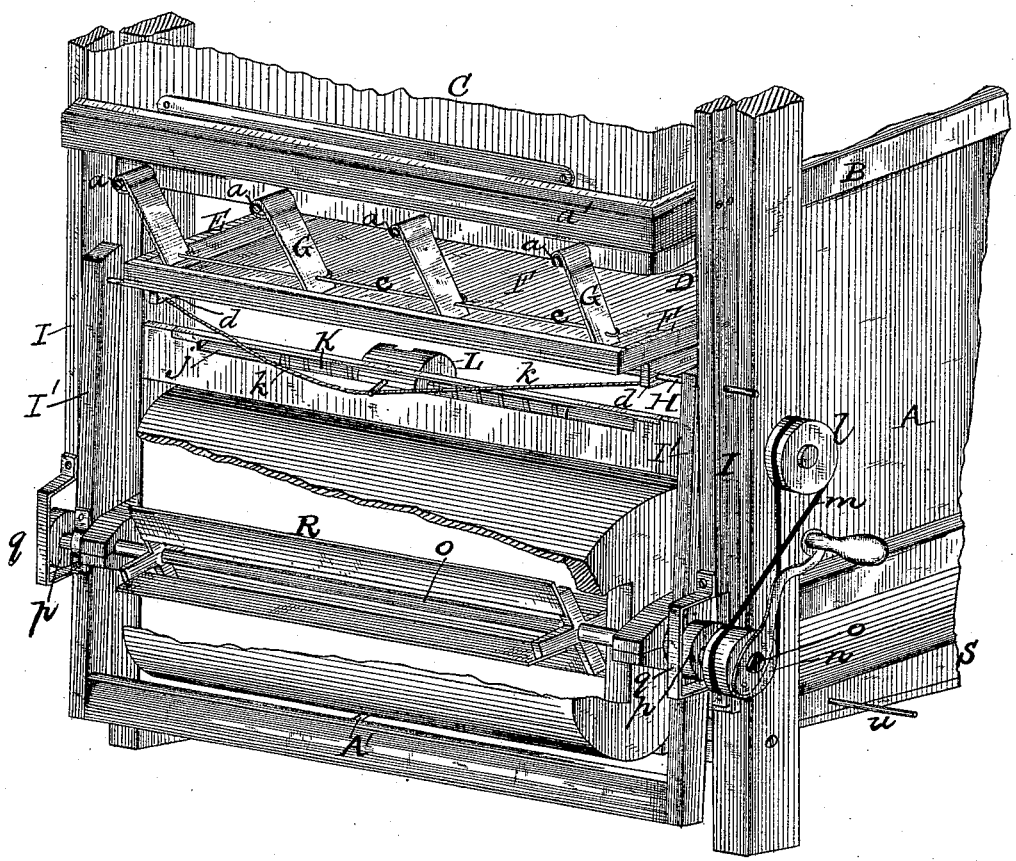

In the drawings, Figure 1 represents a perspective view with a part of the machine removed to show the details. Fig. 2 represents a longitudinal vertical section on the line 2 2 of Fig. 1. Fig. 3 represents a transverse vertical section on the line 3 3 of Fig. 1. Fig. 4 represents a perspective view of the dust-catching device shown and described herein, but which it is designed to embody in a subsequent application for Letters Patent. Fig. 5 represents a sectional plan view of the shaking shoe for separating and carrying the middlings. Fig. 6 represents a sectional perspective view of a portion of the front end of the machine.

In the drawings, A represents the sides, and B the ends, of a bolting-chest of substantially the ordinary construction employed in this class of machinery.

According to one part of my improvements, I entirely dispense with the employment of a suction-fan, and in lieu thereof I arrange a fan or blower at a point below the riddle and blow the dust-laden air against a straining-surface within the machine, which collects the dust and fluff and separates the same from the air and permits the cleaned air to escape and return into the room in which the machine is and from which the fan drew it. I find in practice that the best material of which to construct such dust-catchers is metal, and I have shown in the drawings a desirable form thereof; but I lay no claim in the present application to the form or material of which such dust-catchers are made, as I contemplate making a separate application for patent thereon, and I hereby reserve to myself the right to make such application hereinafter.

C represents a hopper, through which the flour or middlings is introduced to the horizontally-reciprocating bolt or riddle D. The frame E of this riddle or sieve D has at one end an outwardly-extending portion, which forms a head-board, F, upon which the flour or middlings from the hopper falls.

G G represent slides or distributers suitably connected together and having at their upper ends pivotal bearings $a$ in the frame under the feed-board $a'$, in order that as the riddle or bolt reciprocates, its side sills will, during the lateral movement of said bolt, operate to pull the lower end of the outer slide in the same direction, and as these slides are connected together at the lower end by a wire or rod, $c$, such outer slide will in its movement in either lateral direction pull the remaining slides after it, retaining the same relative potion to the face of the head-board, and thus distribute the middlings evenly across the head-board before reaching the head of the cloth.

The frame E of the riddle or bolt D extends from the head to the tail of the machine, and is supported at its head in an inclined position upon a rod, H, which passes through blocks $d$ on the under side of said frame, and has bearings in the part I' of an oscillating frame I I', to be presently described. At its lower or tail end said frame has notched or recessed cleats $e$, within which rests a rod, $f$, which is supported in spring-hangers $g$, attached at their upper ends to the framing-sills, and serves to support, with capability of free movement, the tail end of the riddle-frame.

The bolting-cloth may be of one or any number of degrees of fineness, as desired, and is attached to the bars $h$ $i$. The longitudinal bars $h$ have their under faces made concave in order that when the parts are at rest from lateral motion, as hereinafter described, the bristles of the brushes employed for brushing the cloth may be allowed to retain their perpendicularity and to avoid their being bent or pressed down and broken or forced permanently out of operative shape.

The device for brushing the cloth of the sieve consists of a series of brushes, J, arranged longitudinally of the riddle and rigidly secured in position beneath the same with the tops of the bristles in contact with the under face of the bolting-cloth.

K represents a reversing screw-shaft, which has engagement with a traveler, L, working in a slotted bar or beam, $j$. This traveler is connected by means of a cord or chain, $k$, with the blocks $d$ on the under side of the riddle-frame E.

$l$ represents a pulley mounted upon one end of the screw-shaft K, which connects by means of a belt or band, $m$, with another pulley, $n$, on the fan and driving shaft $o$. Upon motion being imparted to the shaft $o$, the screw-shaft K will, through the medium of the pulleys $l\ n$ and belt $m$, be turned, so as to cause the traveler L to reciprocate in the slotted beam $j$, and as said traveler reciprocates it will, through the medium of the cord $k$, reciprocate in a transverse direction the riddle or bolt D, and thus cause it to travel over the stationary brushes and secure the brushing of the cloth.

Although I have shown a reversing-screw, K, as a convenient means for accomplishing the transverse movement of the riddle, any other suitable means may be employed for accomplishing this result, and such device may be operated by any other shaft than the fan-shaft, as desired or found convenient.

In a middlings-purifier the riddle is reciprocated longitudinally at a high rate of speed. In my machine the rate of reciprocation is about twelve hundred per minute, while its transverse movement is at the rate of about three per minute, and is very gradual. By causing the riddle to move so much more slowly transversely than longitudinally, opportunity is afforded the bristles of the brushes to enter and clear the meshes of the cloth, thereby securing a more perfect brushing of the cloth than would be possible were the transverse movement of the riddle to approximate to its longitudinal movement. All clogging of the meshes of the cloth is entirely prevented by the slow transverse movement of the riddle. When the riddle has in its transverse movement reached either side of the machine, the longitudinal bars $h$ will be immediately above the brushes, and as said bars are made concave on their under faces the bristles will rest in upright position therein and out of contact with the cloth. The riddle remains in this position for a definite time, and during that time the brushing of the cloth is suspended, but the longitudinal movement of the riddle is continuous.

The oscillating frame I compose of two parts, I I', one of which, I', is journaled upon the fan-shaft $o$, and is at its upper end connected by means of rod H with the riddle-frame. The other member, I, of the oscillating frame I I' is connected with each end of the feed-board.

At each outer end of the fan or driving shaft $o$ is an eccentric, $p$, each of which on the revolution of the shaft $o$ revolves within a strap, $q$, on the lower end of the outer member, I, of the oscillating frame. As the shaft $o$ revolves, the eccentrics $p\ p$ are revolved within their respective straps $q\ q$, and the outer member, I, of the frame is thereby oscillated. As the outer member of this frame oscillates it will reciprocate the feed-board and permit the downward flow to the head-board of the middlings or flour, and through connecting-rod H impart a longitudinal oscillatory movement to the inner member of the frame I I', and also to reciprocate the riddle or sieve D. It will thus be seen that the sieve or riddle has imparted to it during the movement of the fan or driving shaft $o$ simultaneously both a longitudinal and a transverse reciprocating movement.

As heretofore remarked, hitherto it has been the custom to form dust-catching devices in this class of machines out of cloth, and to draw the dust-laden air through a suction-fan and convey it to such cloth dust-catcher. In such arrangement the dust clogs the cloth and prevents as free a discharge of the air as is desired. To remedy these and other evils, instead of employing a suction-fan and drawing the dust-laden air through the fan and conveying it either to a room specially constructed for its reception, or to a cloth dust-catching machine, I entirely dispense with the employment of such suction-fan and place a fan-blower at the lower part of the machine and blow the dust-laden air through a suitable straining-surface, as thereby the dust and other impurities are prevented from clogging the straining-surface and the strained air is permitted to freely pass through the straining material and escape for reuse. Such dust-catching devices as it is desired to use may be left to individual tastes and the requirements of any special form of machine. The dust-catcher has its outer surface connected with the casing above the riddle, and is exposed to the atmosphere surrounding the machine in order to afford sufficient ventilating-surface to permit the air to disperse freely and prevent any back pressure upon the riddle or cloth, as would be the case were the dust-catcher inclosed, as then it would be difficult for the air to escape. Were a suction-fan used, the force of the air is greater above than beneath the riddle, consequently rich material is drawn off the cloth with the dust. By employing an under blast-fan, the pressure of the air beneath the riddle forces up the dust and fluff, which being light ascends and is caught on the dust-catcher. When an under blast-fan is used, the upward current of the air above the riddle is too weak to draw upward any heavy particles.

In the drawings I have shown a form of perforated metal dust-catcher such as I intend to employ; but I desire it to be distinctly understood that I do not limit myself to the employment of such construction, form, or arrangement, as reels and various other forms and means of arrangement may be employed without departing from the spirit of this part of the invention.

In the form shown in the drawings, for convenience of illustration as adapted to one form of machine, M represents perforated plates of any suitable metal attached at their upper ends, one to each side of longitudinal beams N.

O are guide-boards, which catch any dust that may drop from the inner faces of said plates and guide the same to the conveying-spouts P. I have not in the present specification minutely described the gathering-boards or dust-catchers and the parts immediately connected therewith, as it is my intention to reserve the same for a subsequent application for patent.

R represents a fan, by means of which air is supplied to the interior of the bolt-chest for the purpose of separating the dust from the middlings. The mouth of the fan-case projects inward and beneath the riddle and the brushing device, and the chest is so closed at these parts that the air from the fan must necessarily pass up through the bolting-cloth to and carry with it the dust up between the inner faces of the perforated metal plates M; then as the perforations r in the plates M are too small to allow the dust to pass through, said dust will, as the air passes through said perforations, be strained out, and either drop down directly to the dust-receiving spouts or slide down the plates M to said spouts, and be by them conveyed to a suitable discharge-spout at the end of the machine.

S represents a shoe or conveyer, which is suspended from the outer sides of the stationary gathering-boards B with capability of reciprocation by straps or hangers s. At one end this shoe is connected by means of a strip, A', with the bottom end of the inner oscillating frame, I, which during its movement imparts to the shoe a longitudinal reciprocation, which motion is at each throw simultaneous with but in an opposite direction to the longitudinal motion of the riddle D above. Thus the throw of one is counterbalanced by the throw of the other in the opposite direction. Thus the vibration imparted to a machine where the throw of the parts is entirely in one direction at each movement, which is always the case where but one eccentric or one set of eccentrics is used, is avoided. This shoe S is divided transversely into two or more compartments by means of horizontally-slotted sides t, having handles or arms u, which project outward through slots in one side of the shoe. The purpose of this shaking shoe is to separate the clean from the less clean middlings, also to separate the middlings according to their degree of fineness, to carry each portion after separation either to separate openings in the bottom of the shoe and gather them into their appropriate spout, or to a single opening and from thence to a single spout, as desired.

The slides are readily operated while the machine is in motion by means of the arms u, so as to open the slots in any given compartment to the requisite extent for the purpose required, or to entirely close the same, and thus regulate the flow of the middlings to any desired discharge-spout.

Having thus described my invention, what I claim therein is—

1. In a middlings-purifier, the combination of a riddle and means for imparting to it a continuous longitudinal reciprocation and a transverse motion of less speed than and independently of the longitudinal motion, substantially as and for the purpose set forth.

2. In a middlings-purifier, a riddle having a continuous longitudinal reciprocation and a transverse motion of less speed than and independently of the longitudinal motion, in combination with a stationary brushing device arranged beneath said riddle, substantially as and for the purpose set forth.

3. The combination, with a riddle or cloth, having frame-bars with concave under faces and means, substantially as described, for imparting an intermittent motion thereto, of a stationary brush or brushes arranged beneath said riddle, and adapted to impinge against the under surface thereof, substantially as and for the purpose set forth.

4. The combination of a shaking sieve, a blast-fan forcing air up through the sieve, and an inclosing casing, and a dust-detaining medium forming the upper portion of the inclosure or casing and permitting the escape of the blast through it to the outer air.

5. The combination, with a riddle frame and cloth having an intermittent transverse motion, of a series of connected slides or distributers pivotally suspended above and transversely of the riddle with their lower ends below the tops of the side sills of the frame of the riddle, to adapt said riddle frame during its transverse motions to engage with the outer distributers and thus reciprocate the connected distributers across the head-board for the purpose of evenly distributing the middlings thereon, substantially as set forth.

6. The combination of an oscillating frame, a riddle having its frame connected to the upper part of said oscillating frame, a pivotally-suspended shoe or conveyer connected to the lower part of said oscillating frame and reciprocating the riddle and conveyer longitudinally simultaneously in opposite directions, and means, substantially as described, for oscillating said frame.

In testimony whereof I affix my signature in presence of two witnesses.

CHARLES G. ROLLINS.

Witnesses:
GEORGE ODLUM,
C. C. LELAND.